US012662143B2

(12) United States Patent
Ogahara et al.

(10) Patent No.: US 12,662,143 B2
(45) Date of Patent: Jun. 23, 2026

(54) VEHICLE CONTROL DEVICE

(71) Applicant: HONDA MOTOR CO., LTD., Tokyo (JP)

(72) Inventors: Atsushi Ogahara, Tokyo (JP); Atsushi Maruyama, Tokyo (JP); Tomoya Takei, Tokyo (JP); Yosuke Wada, Tokyo (JP); Tsubasa Nose, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 19/104,430

(22) PCT Filed: Jul. 5, 2023

(86) PCT No.: PCT/JP2023/024920
§ 371 (c)(1),
(2) Date: Feb. 18, 2025

(87) PCT Pub. No.: WO2024/048068
PCT Pub. Date: Mar. 7, 2024

(65) Prior Publication Data
US 2026/0054740 A1 Feb. 26, 2026

(30) Foreign Application Priority Data
Sep. 1, 2022 (JP) ................................. 2022-139153

(51) Int. Cl.
*B60W 50/06* (2006.01)
*B60W 50/00* (2006.01)
(52) U.S. Cl.
CPC ..... *B60W 50/06* (2013.01); *B60W 2050/0083* (2013.01); *B60W 2520/105* (2013.01)
(58) Field of Classification Search
None
See application file for complete search history.

(56) References Cited

U.S. PATENT DOCUMENTS 7,016,803 B2 * 3/2006 Kitazawa ............. B60K 31/047
701/93
12,017,669 B2 * 6/2024 Kumagai ........... B60W 30/182
(Continued)

FOREIGN PATENT DOCUMENTS

JP 2003-343408 A 12/2003
JP 2004-096822 A 3/2004
(Continued)

OTHER PUBLICATIONS

Written Opinion of the International Searching Authority Corresponding to International Application No. PCT/JP2023/024920, dated Sep. 19, 2023, 3 pages.
(Continued)

*Primary Examiner* — Abdhesh K Jha
(74) *Attorney, Agent, or Firm* — Rankin, Hill & Clark LLP

(57) ABSTRACT

An overshoot of actual acceleration relative to target acceleration is suppressed in controlling acceleration of a vehicle by performing integral control. A vehicle control device includes: an actual acceleration recognition unit that recognizes actual acceleration of a vehicle; an integrated value calculation unit that calculates a time integrated value of a difference between predetermined target acceleration and the actual acceleration; a control instruction value setting unit that sets a control instruction value for a drive apparatus of the vehicle based on the time integrated value; and an integration processing limiting unit that limits calculation of the time integrated value performed by the integrated value calculation unit so that the time integrated value when a predetermined limiting condition is satisfied is smaller than that when the limiting condition is not satisfied.

4 Claims, 3 Drawing Sheets

(56)          References Cited

U.S. PATENT DOCUMENTS

2002/0107106 A1 *   8/2002   Kato ..................... B60W 10/06
                                                          477/181
2005/0258785 A1    11/2005   Hommi et al.

FOREIGN PATENT DOCUMENTS

| | | |
|---|---|---|
| JP | 2004-096939 A | 3/2004 |
| JP | 2013-110808 A | 6/2013 |
| JP | 2018-188015 A | 11/2018 |

OTHER PUBLICATIONS

International Search Report Corresponding to International Application No. PCT/JP2023/024920, dated Sep. 19, 2023, 4 pages.
International Preliminary Report on Patentability dated Mar. 1, 2025, Application No. PCT/JP2023/024920; 5 pages.

\* cited by examiner

VEHICLE CONTROL DEVICE

TECHNICAL FIELD

The present invention relates to a vehicle control device.

BACKGROUND ART

Conventionally, efforts on mitigating climate change or reducing its effects have been continued, and to realize such purposes, research and development on improving vehicle emissions has been conducted. Further, as for travel control of vehicles in association with emission improvement, for example, a vehicle control device has been known which performs integral control of changing control instructions to a control target in proportion to a time integrated value of deviation for eliminating steady deviation between target acceleration and actual acceleration (see, for example, Patent Literature 1).

CITATION LIST

Patent Literature

[Patent Literature 1]
Japanese Patent Laid-Open No. 2018-188015

SUMMARY OF INVENTION

Technical Problem

Now, regarding improvement of vehicle emissions, when a time integrated value of deviation between the target acceleration and the actual acceleration increases due to a lowered followability to the target acceleration, causing an overshoot of the actual acceleration or the like, a fluctuation in drive torque of a vehicle becomes large, resulting in deterioration of emission performance. Thus, a problem to be solved of the present application is to improve emission performance of vehicles by suppressing an overshoot of the actual acceleration relative to the target acceleration.

To solve the aforementioned problem, an object of the present application is to provide a vehicle control device capable of suppressing an overshoot of actual acceleration relative to target acceleration in controlling acceleration of a vehicle by performing integral control.

Solution to Problem

The present description incorporates the entire content of Japanese Patent Application No. 2022-139153 filed on Sep. 1, 2022.

An aspect for achieving the aforementioned purposes may include a vehicle control device including: an actual acceleration recognition unit that recognizes actual acceleration of a vehicle; an integrated value calculation unit that calculates a time integrated value of a difference between predetermined target acceleration and the actual acceleration; a control instruction value setting unit that sets a control instruction value for a drive apparatus of the vehicle based on the time integrated value; and an integration processing limiting unit that limits calculation of the time integrated value performed by the integrated value calculation unit so that the time integrated value when a predetermined limiting condition is satisfied is smaller than the time integrated value when the limiting condition is not satisfied.

Advantageous Effects of Invention

According to the aforementioned vehicle control device, calculation of a time integrated value performed by an integrated value calculation unit is limited when a predetermined limiting condition is satisfied, so that an overshoot of actual acceleration relative to target acceleration can be suppressed in controlling acceleration of a vehicle by performing integral control.

DESCRIPTION OF EMBODIMENT

1. Configuration of Vehicle Control Device

Figure 1:
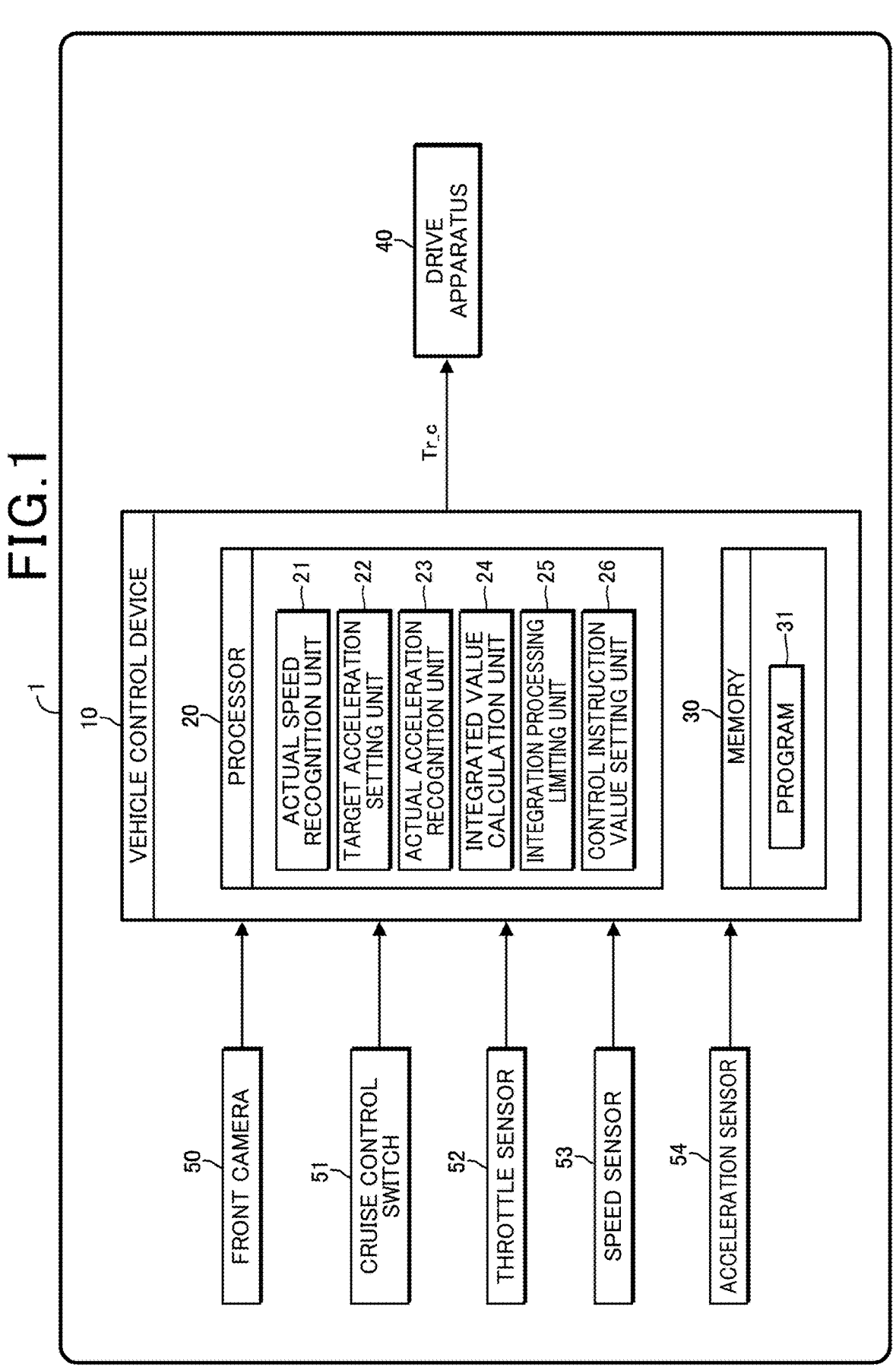
FIG. 1 is a configurational view of a vehicle control device and a vehicle equipped with the vehicle control device.

With reference to FIG. 1, the configuration of a vehicle control device 10 of the present disclosure will be described. The vehicle control device 10 is mounted on a vehicle 1 and controls operation of the vehicle 1. The vehicle 1 is, for example, a two-wheeled vehicle, and includes a drive apparatus 40, a front camera 50, a cruise control switch 51, a throttle sensor 52, a speed sensor 53, and an acceleration sensor 54.

The drive apparatus 40 is composed of an engine that drives drive wheels (not shown), a drive source such as an electric motor, and a control unit of the drive source. The front camera 50 acquires an image of a preceding vehicle or the like by photographing the area ahead of the vehicle 1. The image of the preceding vehicle is used for recognition of the distance between the vehicle 1 and the preceding vehicle or the like. Note that in place of the front camera 50, a ranging sensor such as a radar may be used to recognize the distance between the vehicle 1 and the preceding vehicle. Alternatively, the front camera 50 and the ranging sensor such as the radar may be concurrently used to recognize the distance between the vehicle 1 and the preceding vehicle.

The cruise control switch 51 is a switch for setting auto cruise control that allows the vehicle 1 to travel while maintaining a set speed or for setting adaptive cruise control that automatically adjusts the vehicle speed for maintaining a safe distance from the preceding vehicle, in accordance with operation by a driver of the vehicle 1. Hereinafter, the auto cruise control and the adaptive control are collectively referred to as cruise control.

The throttle sensor 52 detects openings of a throttle grip (not shown) in accordance with operation by a driver of the vehicle 1. The speed sensor 53 recognizes the speed (travel speed) of the vehicle 1. The acceleration sensor 54 recognizes acceleration (travel acceleration) of the vehicle 1.

The vehicle control device 10 is a control unit including a processor 20, a memory 30, and the like, and a program 31 for controlling the vehicle control device 10 is stored in the memory 30. The processor 20 reads and executes the program 31, functioning as an actual speed recognition unit 21, a target acceleration setting unit 22, an actual acceleration recognition unit 23, an integrated value calculation unit 24, an integration processing limiting unit 25, and a control instruction value setting unit 26.

The actual speed recognition unit 21 recognizes the speed (hereinafter, referred to as an actual speed V_r) of the vehicle 1 based on a speed detection signal output from the speed sensor 53. The target acceleration setting unit 22 sets a target acceleration AC_c so as to reduce a difference between a set speed V_ctr by the cruise control and the actual speed V_r when the cruise control is set by the cruise control switch.

The actual acceleration recognition unit 23 recognizes the acceleration (hereinafter, referred to as an actual acceleration AC_r) of the vehicle 1 based on an acceleration detection signal output from the acceleration sensor 54. The integrated value calculation unit 24 calculates a time integrated value that is an integrated value per predetermined time of a difference ΔAC (ΔAC=AC_c−AC_r) between the target acceleration AC_c and the actual acceleration AC_r.

The integration processing limiting unit 25 stops calculation of the integrated value performed by the integrated value calculation unit 24 when limiting conditions satisfying the following first condition and second condition are satisfied.

First condition: The degree of the difference ΔAC between the target acceleration AC_c and the actual acceleration AC_r satisfies ΔAC_Th<|ΔAC|(ΔAC_Th is an acceleration difference determination value).

Second condition: A difference ΔJK between a target jerk JK_c that is a differential value of the target acceleration AC_c and an actual jerk JK_r that is a differential value of the actual acceleration AC_r satisfies ΔJK_Th<ΔJK (ΔJK_Th is a jerk difference determination value) when ΔJK≥0, and satisfies ΔJK<−ΔJK_Th when ΔJK<0.

The control instruction value setting unit 26 calculates a torque instruction value Tr_c that is a control instruction value for the drive apparatus 40 using Formula (1) below and outputs the calculated value to the drive apparatus 40. A third term (integral term) in Formula (1) is the time integrated value, which is calculated by the integrated value calculation unit 24, of the difference ΔAC between the target acceleration AC_c and the actual acceleration AC_r.

[Formula 1]

$$Tr_{c(t)} = \mathrm{Tr\_f}(t) + Kp \cdot \Delta AC(t) + Ki \cdot \int_{ts}^{t} \Delta AC(\tau)\, d\tau \quad (1)$$

where, Tr_f(t): feedforward term at point in time of sampling t, Tr_c(t): torque instruction value at point in time of sampling t, Kp: proportional gain, ΔAC(t): acceleration difference at point in time of sampling t, Ki: integral gain, ts: point in time at the start of integration period of ΔAC.

The feedforward term of the first term in Formula (1) above is calculated, for example, using Formula (2) below.

[Formula 2]

$$\mathrm{Tr\_f}(t) = (M \cdot \mathrm{AC\_c}(t) + \text{Travel resistance}) \times \text{Gear specification} \quad (2)$$

where, Tr_f(t): feedforward term at point in time of sampling t, M: gain, AC_c(t): target acceleration at point in time of sampling t. A travel resistance is set in accordance with travel conditions (gradient of a road or the like) of the vehicle 1. A gear specification is set in accordance with the selection state of a transmission gear of the vehicle 1.

Note that in Formula (1) above, a differential term Kd·dΔAC(t)/dt (Kd is a differential gain) may be added.

2. Configuration of Integration Processing Limiting Unit

Figure 2:
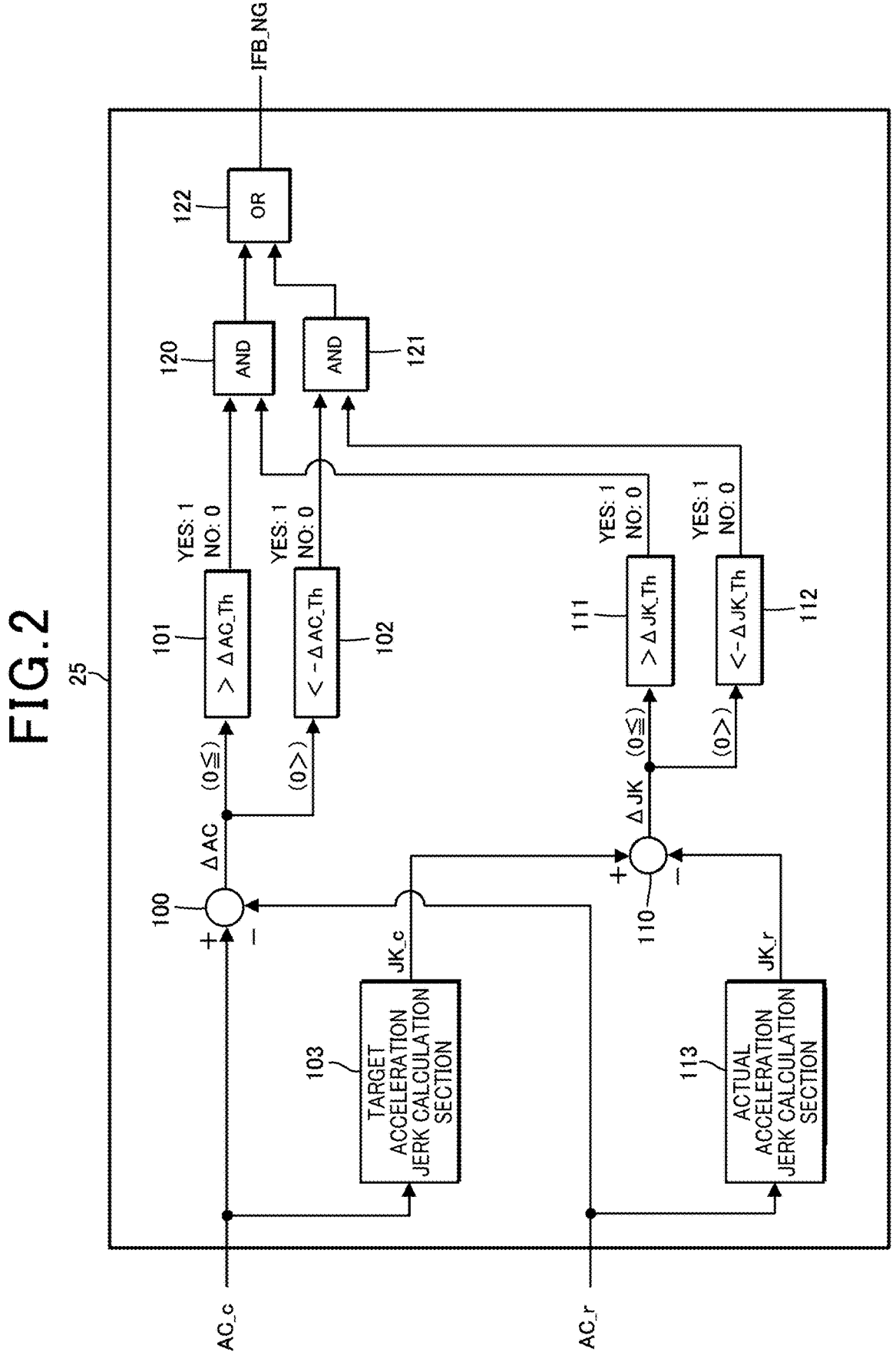
FIG. 2 is a block diagram of processing of an integration processing limiting unit.

With reference to FIG. 2, the configuration of the integration processing limiting unit 25 will be described. When the cruise control is set by the cruise control switch 51, the integration processing limiting unit 25 executes processing of stopping integration performed by the integrated value calculation unit 24, based on the target acceleration AC_c and the actual acceleration AC_r.

The integration processing limiting unit 25 calculates the difference ΔAC between the target acceleration AC_c and the actual acceleration AC_r at a first subtracting section 100. Then, when the difference ΔAC is equal to or greater than 0, the integration processing limiting unit 25 determines at a first comparison section 101 whether the difference ΔAC is greater than the acceleration difference determination value ΔAC_Th. The first comparison section 101 inputs "1" into a first logical conjunction section 120 when the difference ΔAC is greater than the acceleration difference determination value ΔAC_Th, and inputs "0" into the first logical conjunction section 120 when the difference ΔAC is equal to or smaller than the acceleration difference determination value ΔAC_Th.

Meanwhile, when the difference ΔAC is less than 0, the integration processing limiting unit 25 determines at a second comparison section 102 whether the difference ΔAC is smaller than an acceleration determination value −ΔAC_Th. The second comparison section 102 inputs "1" into a second logical conjunction section 121 when the difference ΔAC is smaller than the acceleration determination value −ΔAC_Th, and inputs "0" into the second logical conjunction section 121 when the difference ΔAC is equal to or greater than the acceleration difference determination value −ΔAC_Th. In this manner, whether the aforementioned first condition is satisfied is determined at the first subtracting section 100, the first comparison section 101, and the second comparison section 102.

Further, the integration processing limiting unit 25 calculates the target jerk JK_c that is a differential value of the target acceleration AC_c at a target acceleration jerk calculation section 103 and the actual jerk JK_r that is a differential value of the actual acceleration AC_r is calculated at an actual acceleration jerk calculation section 113. Then, the integration processing limiting unit 25 calculates the difference ΔJK between the target jerk JK_c and the actual jerk JK_r at a second subtracting section 110.

When the difference ΔJK is equal to or greater than 0, the integration processing limiting unit 25 determines at a third comparison section 111 whether the difference ΔJK is greater than a jerk determination value ΔJK_Th. The third comparison section 111 inputs "1" into the first logical conjunction section 120 when the difference ΔJK is greater than the jerk determination value ΔJK_Th, and inputs "0" into the first logical conjunction section 120 when the difference ΔJK is equal to or smaller than the jerk determination value ΔJK_Th.

Meanwhile, when the difference ΔJK is less than 0, the integration processing limiting unit 25 determines at a fourth comparison section 112 whether the difference ΔJK is smaller than a jerk determination value −ΔJK_Th. The fourth comparison section 112 inputs "1" into the second logical conjunction section 121 when the difference ΔJK is smaller than the jerk determination value –ΔJK_Th, and inputs "0" into the second logical conjunction section 121 when the difference ΔJK is equal to or greater than the jerk determination value –ΔJK_Th. In this manner, whether the aforementioned second condition is satisfied is determined at the target acceleration jerk calculation section 103, the actual acceleration jerk calculation section 113, the second subtracting section 110, the third comparison section 111, and the fourth comparison section 112.

Outputs from the first logical conjunction section 120 and the second logical conjunction section 121 are input into a logical disjunction section 122. When the output from the logical disjunction section 122 is "1," the integration processing limiting unit 25 outputs an integration stop flag IFB_NG instructing the integrated value calculation unit 24 to stop integration of the difference ΔAC of acceleration. While the integration stop flag IFB_NG is output, the integrated value calculation unit 24 stops integration of the difference ΔAC of acceleration. The integration of the difference ΔAC of acceleration performed by the integrated value calculation unit 24 is stopped, so that the third term (integral term) in Formula (1) above stops increasing, thereby suppressing an excessive increase in the torque instruction value Tr_c.

The output from the logical disjunction section 122 is "1" when the aforementioned limiting conditions are satisfied, that is, in a case where the output from the first comparison section 101 is "1" and the output from the third comparison section 111 is "1" or in a case where the output from the second comparison section 102 is "1" and the output from the fourth comparison section 112 is "1."

Figure 3:
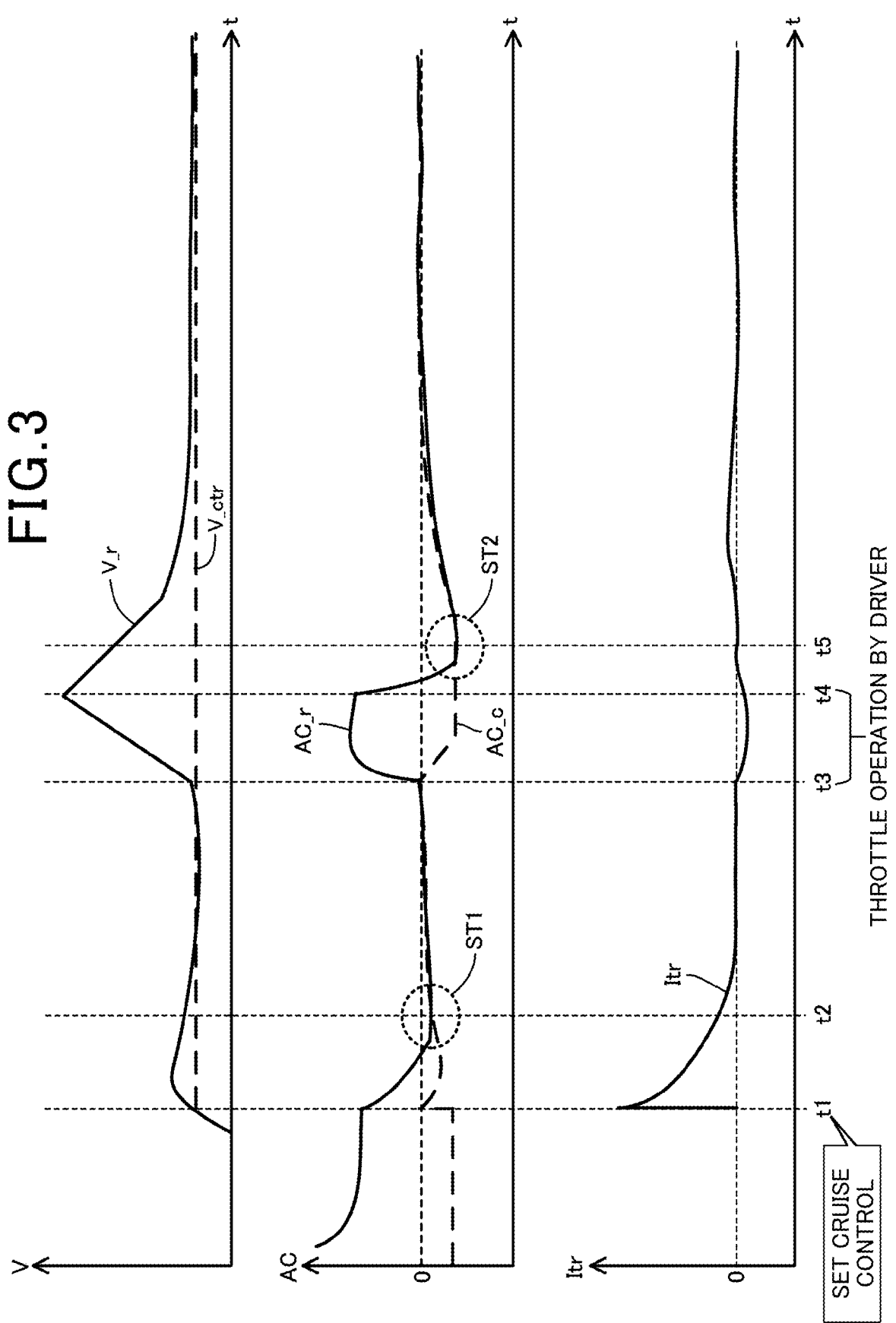
FIG. 3 is an illustration of advantageous effects obtained by limiting time integration of a difference between target acceleration and actual acceleration.

3. Advantageous Effects of Suppressing Integration Performed by Integrated Value Calculation Unit With reference to FIG. 3, the advantageous effects of including the integration processing limiting unit 25 and stopping integration of the difference ΔAC of acceleration performed by the integrated value calculation unit 24 will be described. FIG. 3 is an illustration of a graph of comparison between the actual speed V_r of the vehicle 1 and the set speed V_ctr by the cruise control, a graph of comparison between the target acceleration AC_c and the actual acceleration AC_r, and a graph of an integral value Itr of the third term in Formula (1) above that are shown using a common time axis t.

FIG. 3 shows a state in which the cruise control is set by the cruise control switch 51 at t1 to start the control by the cruise control, the control by the cruise control is suspended by a throttle operation by a driver at t3 to t4, and the control by the cruise control is resumed from t4.

The target acceleration setting unit 22 sets the target acceleration AC_c so as to reduce the difference between the set speed V_ctr by the cruise control and the actual speed V_r of the vehicle 1. Further, the control instruction value setting unit 26 outputs, to the drive apparatus 40, the torque instruction value Tr_c calculated using Formula (1) above based on the difference ΔAC between the target acceleration AC_c and the actual acceleration AC_r. In this manner, the control of reducing the difference between the set speed V_ctr by the cruise control and the actual speed V_r is executed.

With the cruise control set, at t3 to t4 when the driver of the vehicle 1 performs the throttle operation, the control instruction value setting unit 26 sets the torque instruction value Tr_c for the drive apparatus 40 in accordance with the throttle opening detected by the throttle sensor 52. In this manner, the vehicle 1 is accelerated in accordance with the throttle operation by the driver so that the speed of the vehicle 1 increases.

As described above, the integration processing limiting unit 25 stops integration of the difference ΔAC performed by the integrated value calculation unit 24 when the difference ΔAC between the target acceleration AC_c and the actual acceleration AC_r increases and the difference ΔJK between the target jerk JK_c and the actual jerk JK_r increases to accordingly satisfy the aforementioned limiting conditions. In this manner, an excessive change in the third term (integral term) value in Formula (1) above in accordance with a rapid increase or reduction in the actual acceleration AC_r is suppressed.

Therefore, at t1, the cruise control is set, and at ST1 near t2 when the difference ΔAC between the target acceleration AC_c and the actual acceleration AC_r approaches zero, generation of an overshoot (including an undershoot in a negative direction) of the actual acceleration AC_r relative to the target acceleration AC_c is suppressed.

Likewise, at t4, the throttle operation by the driver ends to resume the control by the cruise control, and at ST2 near t5 when the difference ΔAC between the target acceleration AC_c and the actual acceleration AC_r approaches zero, generation of the overshoot (including the undershoot in the negative direction) of the actual acceleration AC_r relative to the target acceleration AC_c is suppressed. In this manner, by suppressing the overshoot of the actual acceleration AC_r relative to the target acceleration AC_c, rapid fluctuations in the acceleration/deceleration of the vehicle 1 are reduced, so that the emission performance of the vehicle 1 can be improved.

4. Other Embodiments

In the aforementioned embodiment, a two-wheeled vehicle has been illustrated as the vehicle 1, but the vehicle control device of the present disclosure is also applicable to any other types of vehicles, such as a three-wheeled vehicle and a four-wheeled vehicle.

In the aforementioned embodiment, the case of reducing the difference ΔAC between the target acceleration AC_c and the actual acceleration AC_r with the control by the cruise control has been described, but the control by the vehicle control device of the present disclosure is also applicable to any other types of control as long as the control of reducing the difference ΔAC between the target acceleration AC_c and the actual acceleration AC_r is performed.

In the aforementioned embodiment, when the aforementioned limiting conditions are satisfied, the integration processing limiting unit 25 stops integration of the difference ΔAC performed by the integrated value calculation unit 24 to limit the integration of the difference ΔAC performed by the integrated value calculation unit 24 so as to reduce the time integrated value of the third term in Formula (1) above as compared to that when the aforementioned limiting conditions are not satisfied. As another embodiment, the time integrated value of the third term in Formula (1) above may be reduced using other techniques of reducing the integral gain Ki in Formula (1) above or the like.

In the aforementioned embodiment, as the limiting conditions of the present disclosure, satisfying the aforementioned first condition and second condition has been illustrated. As another embodiment, only ΔAC_Th<|ΔAC| of the aforementioned first condition may be set as the limiting condition. Alternatively, only $\Delta JK\_Th < |\Delta JK|$ of the aforementioned second condition may be set as the limiting condition.

Note that FIG. 1 and FIG. 2 are schematic views showing the functional configuration of the vehicle control device 10 by sectioning it by main processing contents for easier understanding of the invention of the present disclosure, and the configuration of the vehicle control device 10 may be sectioned in other manners. Further, the processing of each constituent element may be executed by one hardware unit or may be executed by a plurality of hardware units. Furthermore, the processing of each constituent element of the vehicle control device 10 shown in FIG. 1 and FIG. 2 may be executed by one program or may be executed by a plurality of programs.

5. Configuration Supported by the Aforementioned Embodiment

The aforementioned embodiment is a specific example of the following configurations.

(Configuration 1) A vehicle control device including: an actual acceleration recognition unit that recognizes actual acceleration of a vehicle; an integrated value calculation unit that calculates a time integrated value of a difference between predetermined target acceleration and the actual acceleration; a control instruction value setting unit that sets a control instruction value for a drive apparatus of the vehicle based on the time integrated value; and an integration processing limiting unit that limits calculation of the time integrated value performed by the integrated value calculation unit so that the time integrated value when a predetermined limiting condition is satisfied is smaller than the time integrated value when the limiting condition is not satisfied.

According to the vehicle control device of Configuration 1, when the predetermined limiting condition is satisfied, the calculation of the time integrated value performed by the integrated value calculation unit is limited to reduce the control instruction value, so that an overshoot of the actual acceleration relative to the target acceleration can be suppressed in controlling acceleration of a vehicle by performing integral control.

(Configuration 2) The vehicle control device according to Configuration 1, in which when the limiting condition is satisfied, the integration processing limiting unit limits the calculation of the time integrated value performed by the integrated value calculation unit by stopping the calculation of the time integrated value performed by the integrated value calculation unit.

According to the vehicle control device of Configuration 2, with relatively simple processing of stopping the calculation of the time integrated value performed by the integrated value calculation unit, the control instruction value when the limiting condition is satisfied can be reduced.

(Configuration 3) The vehicle control device according to Configuration 1 or Configuration 2, in which the limiting condition is that a difference between a target jerk that is a differential value of the target acceleration and an actual jerk that is the differential value of the actual acceleration is greater than a predetermined jerk difference determination value.

According to the vehicle control device of Configuration 3, when the difference between the target jerk and the actual jerk becomes greater than the jerk difference determination value and the time integrated value of the difference between the target acceleration and the actual acceleration is more likely to increase, an overshoot of the actual acceleration relative to the target acceleration can be suppressed by limiting the calculation of the time integrated value performed by the integrated value calculation unit.

(Configuration 4) The vehicle control device according to any one of Configuration 1 to Configuration 3, in which the limiting condition is that a difference between the target acceleration and the actual acceleration is greater than a predetermined acceleration difference determination value.

According to the vehicle control device of Configuration 4, when the difference between the target acceleration and the actual acceleration becomes greater than the acceleration difference determination value and the time integrated value calculated by the integrated value calculation unit increases, an overshoot of the actual acceleration relative to the target acceleration can be suppressed by limiting the calculation of the time integrated value performed by the integrated value calculation unit.

INDUSTRIAL APPLICABILITY

The vehicle control device of the present disclosure can be used for the purpose of suppressing an overshoot of actual acceleration relative to target acceleration in controlling acceleration of a vehicle by performing integral control.

REFERENCE SIGNS LIST 1 vehicle
10 vehicle control device
20 processor
21 actual speed recognition unit
22 target acceleration setting unit
23 actual acceleration recognition unit
24 integrated value calculation unit
25 integration processing limiting unit
26 control instruction value setting unit
30 memory
31 program
40 drive apparatus
50 front camera
51 cruise control switch
52 throttle sensor
53 speed sensor
54 acceleration sensor

The invention claimed is:

1. A vehicle control device comprising:
an actual acceleration recognition unit that recognizes actual acceleration of a vehicle;
an integrated value calculation unit that calculates a time integrated value of a difference between predetermined target acceleration and the actual acceleration;
a control instruction value setting unit that sets a control instruction value for a drive apparatus of the vehicle based on the time integrated value; and
an integration processing limiting unit that limits calculation of the time integrated value performed by the integrated value calculation unit so that the time integrated value when a predetermined limiting condition is satisfied is smaller than the time integrated value when the limiting condition is not satisfied,
wherein the limiting condition is that a difference between a target jerk that is a differential value of the target acceleration and an actual jerk that is the differential value of the actual acceleration is greater than a predetermined jerk difference determination value.

2. The vehicle control device according to claim 1, wherein when the limiting condition is satisfied, the integration processing limiting unit limits the calculation of the time integrated value performed by the integrated value calculation unit by stopping the calculation of the time integrated value performed by the integrated value calculation unit.

3. A vehicle control device comprising:

an actual acceleration recognition unit that recognizes actual acceleration of a vehicle;

an integrated value calculation unit that calculates a time integrated value of a difference between predetermined target acceleration and the actual acceleration;

a control instruction value setting unit that sets a control instruction value for a drive apparatus of the vehicle based on the time integrated value; and an integration processing limiting unit that limits calculation of the time integrated value performed by the integrated value calculation unit so that the time integrated value when a predetermined limiting condition is satisfied is smaller than the time integrated value when the limiting condition is not satisfied, wherein the limiting condition is that a difference between the target acceleration and the actual acceleration is greater than a predetermined acceleration difference determination value.

4. The vehicle control device according to claim 3, wherein when the limiting condition is satisfied, the integration processing limiting unit limits the calculation of the time integrated value performed by the integrated value calculation unit by stopping the calculation of the time integrated value performed by the integrated value calculation unit.

* * * * *